United States Patent
Cheng et al.

(10) Patent No.: US 9,785,447 B2
(45) Date of Patent: Oct. 10, 2017

(54) SYSTEM STANDBY EMULATION WITH FAST RESUME

(71) Applicant: Intel Corporation, Santa Clara, CA (US)

(72) Inventors: Antonio S. Cheng, Portland, OR (US); Siddharth Shah, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/317,628

(22) Filed: Jun. 27, 2014

(65) Prior Publication Data

US 2015/0378748 A1 Dec. 31, 2015

(51) Int. Cl.
*G06F 1/00* (2006.01)
*G06F 9/44* (2006.01)
*G06F 1/32* (2006.01)

(52) U.S. Cl.
CPC .......... *G06F 9/4418* (2013.01); *G06F 1/3287* (2013.01); *G06F 1/3293* (2013.01)

(58) Field of Classification Search
CPC ..... G06F 9/4418; G06F 1/3287; G06F 1/3293
USPC ........................................................ 713/323
See application file for complete search history.

(56) References Cited

U.S. PATENT DOCUMENTS

| | | | | |
|---|---|---|---|---|
| 6,016,548 | A * | 1/2000 | Nakamura | G06F 1/3203 307/125 |
| 6,266,776 | B1 * | 7/2001 | Sakai | G06F 1/3203 713/300 |
| 2004/0225907 | A1 | 11/2004 | Jain et al. | |
| 2009/0172439 | A1 * | 7/2009 | Cooper | G06F 1/3203 713/323 |
| 2012/0254613 | A1 * | 10/2012 | Nimura | G06F 21/572 713/168 |
| 2013/0031390 | A1 * | 1/2013 | Smith, III | G06F 1/206 713/320 |
| 2013/0097444 | A1 | 4/2013 | Hoagland et al. | |
| 2014/0143572 | A1 * | 5/2014 | Horiuchi | G06F 1/3203 713/323 |

FOREIGN PATENT DOCUMENTS

WO    0203182 A2    1/2002

OTHER PUBLICATIONS

ACPI, "Advanced Configuration and Power Interface Specification", Revision 5.0, Dec. 6, 2011, 23 pages.
International Search Report and Written Opinion for International Patent Application No. PCT/US2015/036324, mailed Sep. 17, 2015, 14 pages.

* cited by examiner

*Primary Examiner* — Robert Cassity
(74) *Attorney, Agent, or Firm* — Jordan IP Law, LLC

(57) ABSTRACT

Systems and methods may provide for assuming control over a processor in response to an operating system (OS) request to transition the processor into a sleeping state and transitioning the processor into an intermediate state that has a shorter wake latency than the sleeping state. Additionally, the processor may be maintained in the intermediate state until a wake event is detected. In one example, one or more power lowering operations may be reversed in response to the wake event.

24 Claims, 4 Drawing Sheets

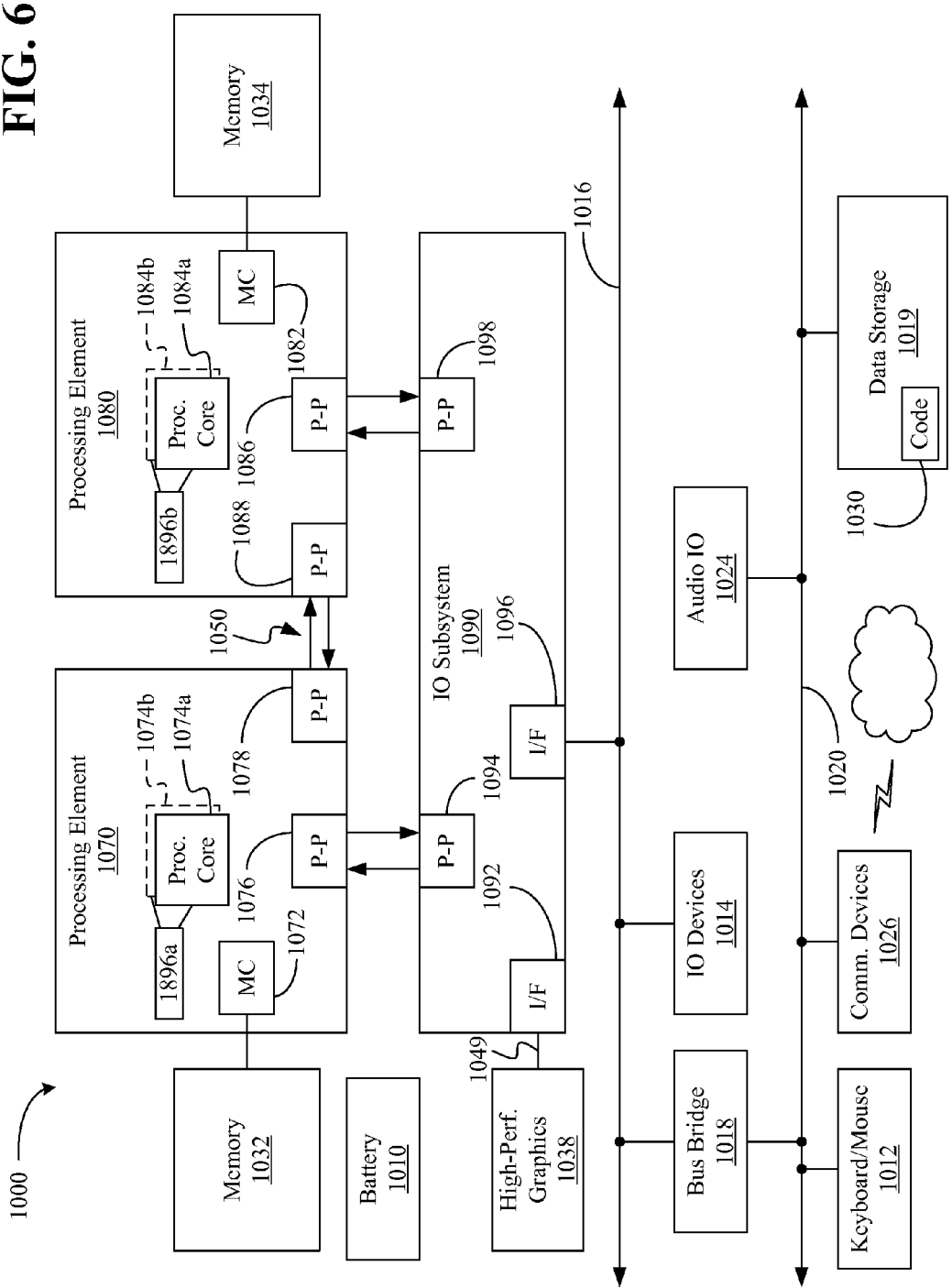

SYSTEM STANDBY EMULATION WITH FAST RESUME

TECHNICAL FIELD

Embodiments generally relate to power management in computing systems. More particularly, embodiments relate to emulating system standby to achieve faster resume times.

BACKGROUND

Computing systems such as notebook computers and tablet computers may transition from active states into sleep states during periods of idleness in order to conserve power. For example, to trigger a system standby, an operating system (OS) might invoke the S3 sleeping state via an interface defined in the Advanced Configuration and Power Interface (ACPI, e.g., ACPI Specification, Rev. 5.0a, Dec. 6, 2011) specification, wherein the S3 state may involve powering down the computing system and relying on basic input/output system (BIOS) code running in flash memory to configure the computing system as part of the overall resume flow to the active state in response to a wake event. The wake latency of the S3 sleeping state, however, may prevent "instant-on" functionality from being achieved by the computing system. While other low power states having shorter wake latency states may be developed for the computing system, the OS may still be configured to work only with traditional and relatively inflexible ACPI sleeping states.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a computing system according to an embodiment.

DESCRIPTION OF EMBODIMENTS

Figure 1:
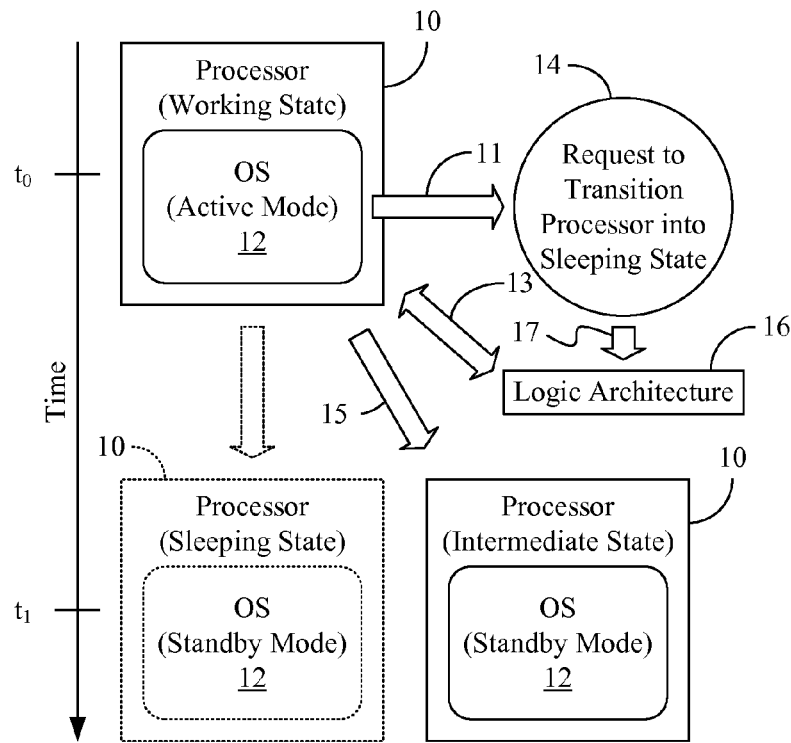
FIG. 1 is a block diagram of an example of a state transition in a processor according to an embodiment.

Turning now to FIG. 1, a processor 10 (e.g., central processing unit/CPU, input/output module, chipset) is shown, wherein the processor 10 runs an operating system (OS) 12 such as, for example, an ANDROID (Open Handset Alliance), IOS (APPLE, Inc.), LINUX (Linux Foundation), or WINDOWS (MICROSOFT Corp.) operating system. The processor 10 may be incorporated into a wide variety of computing systems such as, for example, a server, workstation, desktop computer, notebook computer, tablet computer, convertible tablet, smart phone, personal digital assistant/PDA, mobile Internet device (MID), media player, wearable computer, and so forth.

In the illustrated example, at time $t_0$ the OS 12 is in the active mode and generates a request 14 via arrow 11 to transition the processor 10 into a sleeping state such as, for example, the ACPI S3 or S1 sleeping state. The request 14 may be generated by, for example, writing to an enablement register (e.g., SLP_EN register), wherein a logic architecture 16 may detect and/or intercept via arrow 17 the write to the enablement register. As will be discussed in greater detail, the logic architecture 16 may be implemented as a basic input/output system (BIOS) in the form of logic instructions, configurable logic, fixed-functionality hardware logic, etc., or any combination thereof.

At illustrated time $t_1$, rather than placing the processor 10 in the requested sleeping state, the logic architecture 16 controls the processor 10, via arrow 13, in order to transition the processor 10 into an intermediate state, via arrow 15, that has a shorter wake latency than the requested state. For example, the intermediate state might be the ACPI S0 working state with additional power lowering operations being performed by the logic architecture 16 in order to achieve greater power savings. Indeed, the intermediate state may result in lower power consumption relative to the requested sleeping state while providing nearly immediate return to the active state (e.g., instant-on functionality). Moreover, the logic architecture 16 may emulate the standard system standby operation expected by the OS 12. As a result, the illustrated approach may be advantageous from a user experience standpoint as well as a power consumption and battery life standpoint, while the OS 12 is agnostic to the state deviation.

Figure 2:
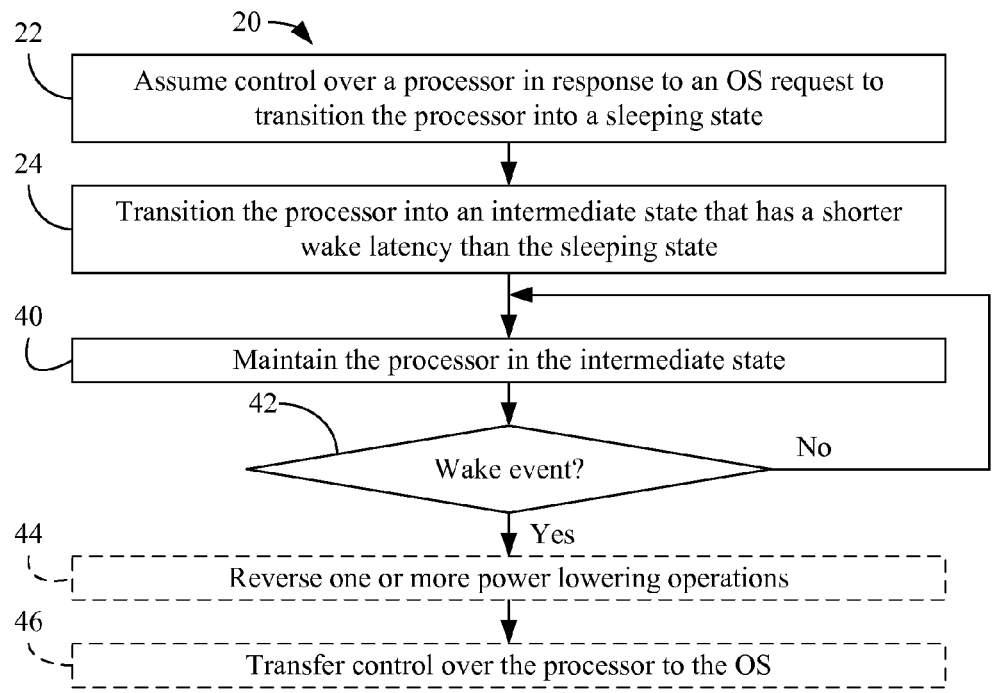
FIG. 2 is a flowchart of an example of a method of operating a BIOS according to an embodiment.

Turning now to FIG. 2, a method 20 of operating a BIOS is shown. The method 20 may be implemented as a module or related component in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 20 may be written in any combination of one or more programming languages, including an object oriented programming language such as Java, Smalltalk, C++, ACPI source language (ASL) or the like and conventional procedural programming languages, such as the "C" programming language or similar programming languages.

Illustrated processing block 22 provides for assuming control over a processor in response to an OS request to transition the processor into a sleeping state. The processor may be transitioned at block 24 into an intermediate state that has a shorter wake latency than the sleeping state and with similar or better battery life. As already noted, the requested sleeping state might be, for example, the ACPI S3 or S1 sleeping states.

Figure 3A:
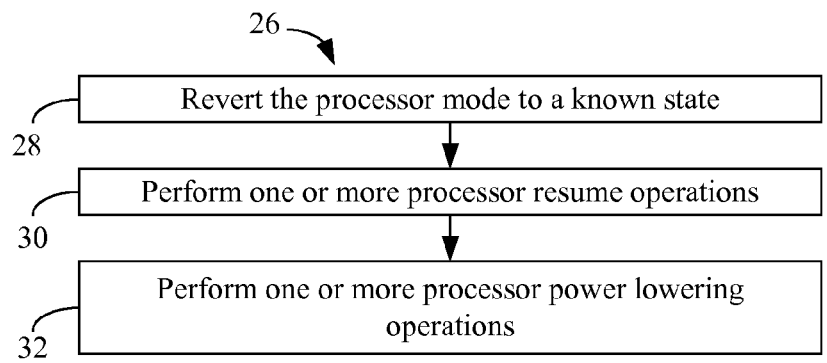
FIGS. 3A and 3B are flowcharts of examples of methods of transitioning/entering a processor into an intermediate state according to embodiments.

More particularly, FIG. 3A demonstrates a method 26 that provides one approach to transitioning the processor into the intermediate state when the requested sleeping state is the S3 state. The illustrated method 26 may therefore be readily substituted for block 24 (FIG. 2), already discussed. Generally, for S3 state requests, the OS may expect to resume from a clean processor state (e.g., "real mode"). Therefore, BIOS may change the processor back from the current OS context to the clean state. More particularly, the processor mode is reverted to a known state (e.g., independent of the processor state left behind by the OS) at illustrated block 28, wherein the reversion may clear the context of the processor, as expected by the OS making the transition request. Clearing the state of the processor may therefore ensure that the subsequent handoff of control back to the OS will occur seamlessly. Additionally, one or more processor resume operations may be performed at block 30. The processor resume operations may include, for example, restoring memory controller configuration data from non-volatile memory, and so forth, after the reversion is conducted. Illustrated block 32 performs one or more processor power lowering operations, which may involve, for example, power rail modifications, enhanced clock gating, active idle operations, and so forth, in order to reduce the power consumption of the processor while it is in the intermediate state.

Figure 3B:
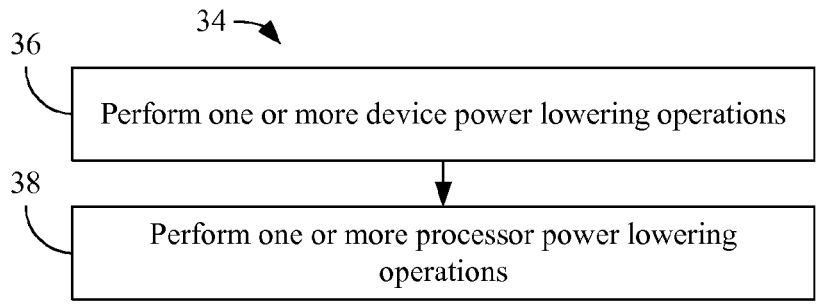

In another example, FIG. 3B demonstrates a method 34 that provides an approach to transitioning the processor into the intermediate state when the requested sleeping state is the shallower S1 state. The illustrated method 34 may therefore be readily substituted for block 24 (FIG. 2), already discussed. Generally, for S1 state requests, the OS may expect resumption in the next instruction. Therefore, power saving work may be done in this case without changing the processor context that OS left behind. More particularly, one or more device power lowering operations are performed at illustrated block 36. The device power lowering operations may include, for example, instructing system components such as an embedded controller (EC) of a display, keypad, etc., to enter their lowest power state. Additionally, one or more processor power lowering operations (e.g., power rail modifications, enhanced clock gating, active idle operations) may be performed at block 38.

Returning now to FIG. 2, illustrated block 40 maintains the processor in the intermediate state, wherein a determination as to whether a wake event has occurred may be made at block 42. The wake event may include, for example, a user of the computing system pressing/activating a power on button (e.g., hard button or soft button), an incoming message (e.g., text message, email, social networking post, etc.) being detected, and so forth. If a wake event is not detected, the illustrated method 20 continues to maintain the processor in the intermediate state by returning to block 40. If a wake event is detected, block 44 may optionally reverse one or more power lowering operations (e.g., if the requested sleeping state is the S1 sleeping state), wherein the reversed power lowering operations may be processor power lowering operations, device lowering operations, etc., or any combination thereof. Additionally, control over the processor may optionally be transferred to the OS at block 46 (e.g., if the requested sleeping state is the S3 sleeping state).

Of particular note is that the amount of time between detection of the wake event at block 42 and transferring control at block 46 may be considerably less than the amount of time to resume normal operation in the working state from either the S3 or S1 sleeping states. For example, in the example of an S3 sleeping state transition request, the processor reset and resume operations at blocks 28 and 30 (FIG. 3A), respectively, may be previously handled when the system standby is initially requested by the OS. Moreover, block 46 may alternatively be conducted after, or in parallel with, block 44 to further reduce the wake latency. Additionally, BIOS re-authentication may be bypassed in the illustrated example, because the BIOS may not run in potentially untrustworthy flash memory when the processor is in the intermediate state. Indeed, the intermediate state in the illustrated example is merely a working/idle state that emulates system standby from the perspective of the OS.

Figure 4:
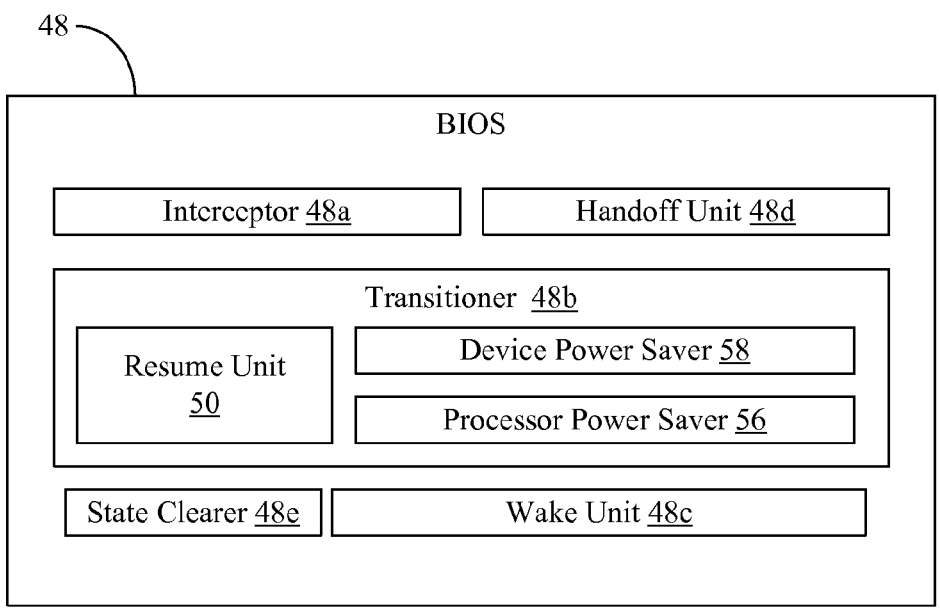
FIG. 4 is a block diagram of an example of a BIOS apparatus according to an embodiment.

FIG. 4 shows a BIOS apparatus 48 (48*a*-48*e*) that may be used to emulate system standby. The BIOS apparatus 48 may generally implement one or more aspects of the method 20 (FIG. 2) and may be readily substituted for the logic architecture 16 (FIG. 1), already discussed. Thus, the BIOS apparatus 48 may be implemented in logic instructions, configurable logic, fixed-functionality hardware logic, etc., or any combination thereof. In one example, the BIOS apparatus 48 operates from system memory rather than potentially unprotected flash memory as may be the case when resuming from the S3 sleeping state.

In the illustrated example, an interceptor 48*a* assumes control over a processor in response to an OS request to transition the processor into a sleeping state such as the ACPI S3 state or S1 state. In one example, the interceptor 48*a* includes a system management interrupt/SMI handler to detect a write of the OS to an enablement register. Additionally, a transitioner 48*b* may generally transition the processor into an intermediate state (e.g., S0 low power state) that has a shorter wake latency than the sleeping state. The illustrated BIOS apparatus 48 also includes a wake unit 48*c* that maintains the processor in the intermediate state until a wake event is detected. In one example, the transitioner 48*b* includes an optional resume unit 50 to reverse one or more power lowering operations (e.g., device power lowering operations, processor power lowering operations). Alternatively, the functionality of the resume unit 50 may be automatically handled by the OS resume flow, depending on the power saving solutions used for the intermediate state.

Thus, if the requested sleeping state is the ACPI S3 state, the BIOS apparatus 48 might include a state clearer 48*e* to revert a mode of the processor to a known state (e.g., conduct a reset of the processor), wherein the resume unit 50 may also perform one or more processor resume operations (e.g., restoral of memory configuration data) in response to the standby request. Additionally, a processor power saver 56 may perform one or more processor power lowering operations (e.g., power rail modifications, enhanced clock gating, active idle operations). The illustrated BIOS apparatus 48 also includes a handoff unit 48*d* that transfers control over the processor back to the OS when a wake event is detected and the requested state is the ACPI S3 sleeping state.

If, on the other hand, the requested sleeping state is the ACPI S1 state, the transitioner 48*b* may include a device power saver 58 to perform one or more device power lowering operations (e.g., issuance of EC power commands). In such a case, the processor power saver 56 may also perform one or more processor power lowering operations to emulate the requested S1 state. Thus, the state clearer 48*e* may be bypassed when the requested sleeping state is the ACPI S1 state because the illustrated transitioner 48*b* operates without having an impact on OS states in such a case.

Figure 5:
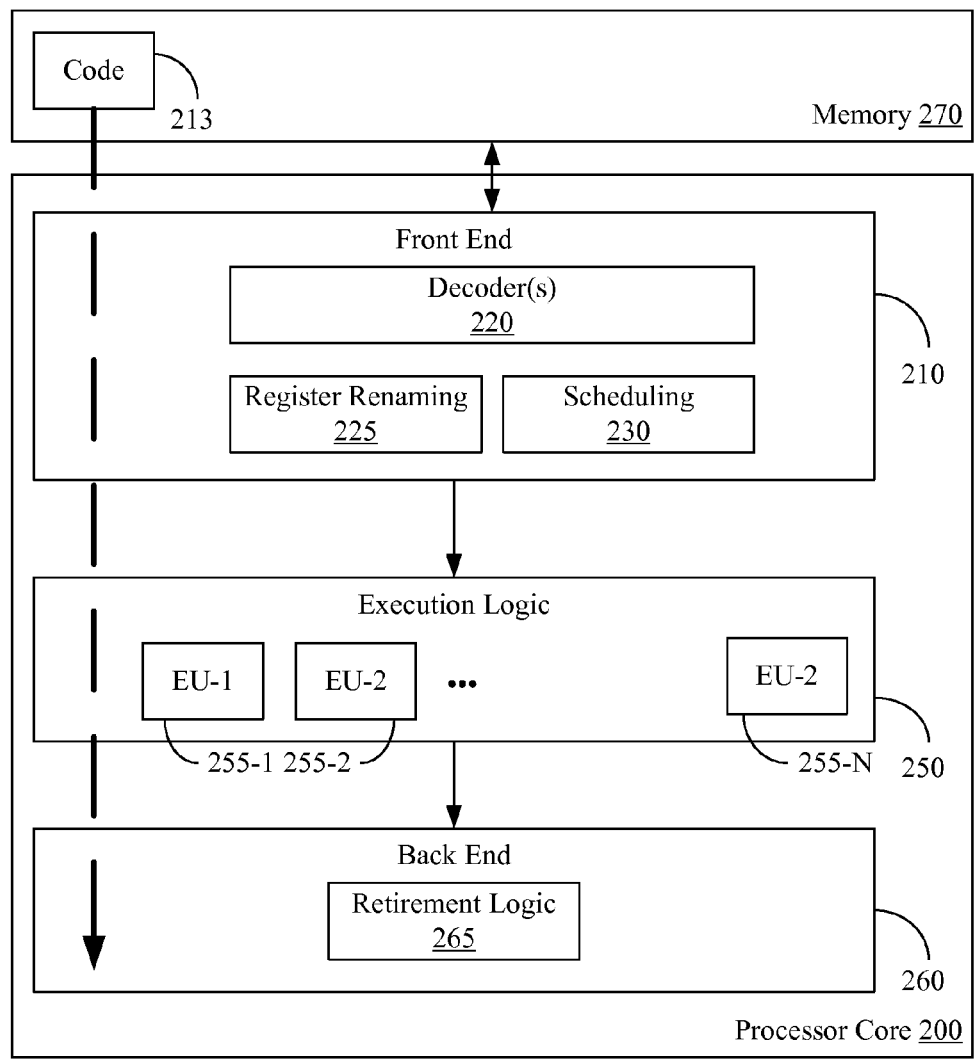
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 20 (FIG. 2), already discussed. In one example, the memory 270 is non-flash memory. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 20 (FIG. 2), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include a computing system to emulate system standby, comprising a battery to supply power to the computing system, a processor to run an operating system (OS) and a basic input/output system (BIOS) comprising an interceptor to assume control over the processor in response to an OS request to transition the processor into a sleeping state, a transitioner to transition the processor into an intermediate state that has a shorter wake latency than the sleeping state, and a wake unit to maintain the processor in the intermediate state until a wake event is detected.

Example 2 may include the computing system of Example 1, wherein the BIOS further includes a resume unit to reverse one or more power lowering operations in response to the wake event.

Example 3 may include the computing system of any one of Examples 1 or 2, wherein the transitioner includes a state clearer to conduct a reset of the processor, a resume unit to perform one or more processor resume operations, a processor power saver to perform one or more processor power lowering operations, and a handoff unit to transfer control over the processor to the OS in response to a wake event.

Example 4 may include the computing system of Example 3, wherein the sleeping state is to be an Advanced Configuration and Power Interface (ACPI) S3 state.

Example 5 may include the computing system of any one of Examples 1 or 2, wherein the transitioner includes a device power saver to perform one or more device power lowering operations, and a processor power saver to perform one or more processor power lowering operations.

Example 6 may include the computing system of Example 5, wherein the sleeping state is to be an Advanced Configuration and Power Interface (ACPI) S1 state.

Example 7 may include a method of operating a BIOS, comprising assuming control over a processor in response to an OS request to transition the processor into a sleeping state, transitioning the processor into an intermediate state that has a shorter wake latency than the sleeping state, and maintaining the processor in the intermediate state until a wake event is detected.

Example 8 may include the method of Example 7, further including reversing one or more power lowering operations in response to the wake event.

Example 9 may include the method of any one of Examples 7 or 8, wherein transitioning the processor into the intermediate state includes conducting a reset of the processor, performing one or more processor resume operations, performing one or more processor power lowering operations, and transferring control over the processor to the OS.

Example 10 may include the method of Example 9, wherein the sleeping state is an Advanced Configuration and Power Interface (ACPI) S3 state.

Example 11 may include the method any one of Examples 7 or 8, wherein transitioning the processor into the intermediate state includes performing one or more device power lowering operations, and performing one or more processor power lowering operations Example 12 may include the method of Example 11, wherein the sleeping state is an Advanced Configuration and Power Interface (ACPI) S1 state.

Example 13 may include at least one computer readable storage medium comprising a set of BIOS instructions which, when executed by a computing system, cause the computing system to assume control over a processor in response to an OS request to transition the processor into a sleeping state, transition the processor into an intermediate state that has a shorter wake latency than the sleeping state and maintain the processor in the intermediate state until a wake event is detected.

Example 14 may include the at least one computer readable storage medium of Example 13, wherein the BIOS instructions, when executed, cause a computing system to reverse one or more power lowering operations in response to the wake event.

Example 15 may include the at least one computer readable storage medium of any one of Examples 13 or 14, wherein the BIOS instructions, when executed, cause a computing system to conduct a reset of the processor, perform one or more processor resume operations, perform one or more processor power lowering operations, and transfer control over the processor to the OS.

Example 16 may include the at least one computer readable storage medium of Example 15, wherein the sleeping state is to be an Advanced Configuration and Power Interface (ACPI) S3 state.

Example 17 may include the at least one computer readable storage medium of any one of Examples 13 or 14, wherein the BIOS instructions, when executed, cause a computing system to perform one or more device power lowering operations, and perform one or more processor power lowering operations.

Example 18 may include the at least one computer readable storage medium of Example 17, wherein the sleeping state is to be an Advanced Configuration and Power Interface (ACPI) S1 state.

Example 19 may include a BIOS apparatus comprising an interceptor to assume control over a processor in response to an OS request to transition the processor into a sleeping state, a transitioner to transition the processor into an intermediate state that has a shorter wake latency than the sleeping state, and a wake unit to maintain the processor in the intermediate state until a wake event is detected.

Example 20 may include the apparatus of Example 19, further including a resume unit to reverse one or more power lowering operations in response to the wake event.

Example 21 may include the apparatus of any one of Examples 19 or 20, wherein the transitioner includes a state clearer to conduct a reset of the processor, a resume unit to perform one or more processor resume operations, a processor power saver to perform one or more processor power lowering operations, and a handoff unit to transfer control over the processor to the OS.

Example 22 may include the apparatus of Example 21, wherein the sleeping state is to be an Advanced Configuration and Power Interface (ACPI) S3 state.

Example 23 may include the apparatus of any one of Examples 19 or 20, wherein the transitioner includes a device power saver to perform one or more device power lowering operations, and a processor power saver to perform one or more processor power lowering operations.

Example 24 may include the apparatus of Example 23, wherein the sleeping state is to be an Advanced Configuration and Power Interface (ACPI) S1 state.

Example 25 may include a basic input/output system (BIOS) apparatus comprising means for perform the method of any of Examples 7 to 12.

Thus, techniques described herein may enable "instant-on" functionality to be achieved while fully supporting more flexible sleep states, substantial power savings and extended battery life. Moreover, systems paired with an OS that supports standard ACPI standby mode may benefit from hardware and software enhancements such as low power CPU and chipset idle operation, resume without system reset and subsequent hardware sequencing, resume without system firmware (e.g., BIOS) assistance and re-authentication, and so forth. Additionally, techniques may obviate any need for sensor based speculative resume approaches and may in turn provide greater consistency during system standby.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
    a battery to supply power to the computing system;
    a processor to run an operating system (OS);
    a basic input/output system (BIOS) comprising:
        an interceptor, implemented in one or more of configurable logic or fixed-functionality hardware logic, to assume control over the processor in response to an OS request to transition the processor into a sleeping state;
        a transitioner, implemented in one or more of configurable logic or fixed-functionality hardware logic, to transition the processor into an intermediate state that has a shorter wake latency than the sleeping state, wherein the transitioner includes a device power saver, implemented in one or more of configurable logic or fixed-functionality hardware logic, to perform one or more device power lowering operations including issuance of embedded controller (EC) power commands; and
        a wake unit, implemented in one or more of configurable logic or fixed-functionality hardware logic, to maintain the processor in the intermediate state until a wake event is detected, wherein the transitioner is to transfer control over the processor to the OS in parallel with the device power saver reversing one or more of the power lowering operations, and without BIOS re-authentication.

2. The computing system of claim 1, wherein the BIOS further includes a resume unit, implemented in one or more of configurable logic or fixed-functionality hardware logic, to reverse one or more power lowering operations in response to the wake event, wherein the one or more power lowering operations are to restore memory configuration data from a non-volatile memory.

3. The computing system of claim 1, wherein the transitioner includes:
    a state clearer, implemented in one or more of configurable logic or fixed-functionality hardware logic, to conduct a reset of the processor;
    a resume unit, implemented in one or more of configurable logic or fixed-functionality hardware logic, to perform one or more processor resume operations, including to restore memory configuration data;

a processor power saver, implemented in one or more of configurable logic or fixed-functionality hardware logic, to perform one or more processor power lowering operations including power rail modifications to reduce a power consumption of the processor; and a handoff unit, implemented in one or more of configurable logic or fixed-functionality hardware logic, to transfer control over the processor to the OS in response to the wake event.

4. The computing system of claim 3, wherein the sleeping state is to be an Advanced Configuration and Power Interface (ACPI) S3 state.

5. The computing system of claim 1, wherein the transitioner include:

a processor power saver, implemented in one or more of configurable logic or fixed-functionality hardware logic, to perform one or more processor power lowering operations including power rail modifications to reduce a power consumption of the processor.

6. The computing system of claim 5, wherein the sleeping state is to be an Advanced Configuration and Power Interface (ACPI) S1 state, wherein, when the requested sleeping state is the ACPI S1 state, a state clearer, implemented in one or more of configurable logic or fixed-functionality hardware logic, to conduct a reset of the processor is to be bypassed.

7. A method of operating a basic input/output system (BIOS), comprising:

assuming control over a processor in response to an operating system (OS) request to transition the processor into a sleeping state;

transitioning the processor into an intermediate state that has a shorter wake latency than the sleeping state by performing one or more device power lowering operations including issuance of embedded controller (EC) power commands; and maintaining the processor in the intermediate state until a wake event is detected, wherein control over the processor is to be transferred to the OS in parallel with the device power saver reversing one or more of the power lowering operations, and without BIOS re-authentication.

8. The method of claim 7, further including reversing one or more power lowering operations in response to the wake event, wherein the one or more power lowering operations include restoring memory configuration data from a non-volatile memory.

9. The method of claim 7, wherein transitioning the processor into the intermediate state includes:

conducting a reset of the processor;

performing one or more processor resume operations, including to restore memory configuration data;

performing one or more processor power lowering operations including power rail modifications to reduce a power consumption of the processor; and transferring control over the processor to the OS.

10. The method of claim 9, wherein the sleeping state is an Advanced Configuration and Power Interface (ACPI) S3 state.

11. The method of claim 7, wherein transitioning the processor into the intermediate state includes:

performing one or more processor power lowering operations including power rail modifications to reduce a power consumption of the processor.

12. The method of claim 11, wherein the sleeping state is an Advanced Configuration and Power Interface (ACPI) S1 state, and wherein, when the sleeping state is the ACPI S1 state, a state clearer, implemented in one or more of configurable logic or fixed-functionality hardware logic, to conduct a reset of the processor is to be bypassed.

13. At least one non-transitory computer readable storage medium comprising a set of basic input/output system (BIOS) instructions which, when executed by a computing system, cause the computing system to:

assume control over a processor in response to an operating system (OS) request to transition the processor into a sleeping state;

transition the processor into an intermediate state that has a shorter wake latency than the sleeping state and perform one or more device power lowering operations including issuance of embedded controller (EC) power commands; and maintain the processor in the intermediate state until a wake event is detected, wherein control over the processor is to be transferred to the OS in parallel with the device power saver reversing one or more of the power lowering operations, and without BIOS re-authentication.

14. The at least one non-transitory computer readable storage medium of claim 13, wherein the BIOS instructions, when executed, cause a computing system to reverse one or more power lowering operations in response to the wake event, wherein the one or more power lowering operations include restoring memory configuration data from a non-volatile memory.

15. The at least one non-transitory computer readable storage medium of claim 13, wherein the BIOS instructions, when executed, cause a computing system to:

conduct a reset of the processor;

perform one or more processor resume operations, including to restore memory configuration data;

perform one or more processor power lowering operations including power rail modifications to reduce a power consumption of the processor; and transfer control over the processor to the OS.

16. The at least one non-transitory computer readable storage medium of claim 15, wherein the sleeping state is to be an Advanced Configuration and Power Interface (ACPI) S3 state.

17. The at least one non-transitory computer readable storage medium of claim 13, wherein the BIOS instructions, when executed, cause a computing system to: perform one or more processor power lowering operations including power rail modifications to reduce a power consumption of the processor.

18. The at least one non-transitory computer readable storage medium of claim 17, wherein the sleeping state is to be an Advanced Configuration and Power Interface (ACPI) S1 state, wherein, when the sleeping state is the ACPI S1 state, a state clearer, implemented in one or more of configurable logic or fixed-functionality hardware logic, to conduct a reset of the processor is to be bypassed.

19. A basic input/output system (BIOS) apparatus comprising:

an interceptor, implemented in one or more of configurable logic or fixed-functionality hardware logic, to assume control over a processor in response to an operating system (OS) request to transition the processor into a sleeping state;

a transitioner, implemented in one or more of configurable logic or fixed-functionality hardware logic, to transition the processor into an intermediate state that has a shorter wake latency than the sleeping state, wherein the transitioner includes a device power saver, implemented in one or more of configurable logic or fixed-functionality hardware logic, to perform one or more device power lowering operations including issuance of embedded controller (EC) power commands; and a wake unit, implemented in one or more of configurable logic or fixed-functionality hardware logic, to maintain the processor in the intermediate state until a wake event is detected, wherein the transitioner is to transfer control over the processor to the OS in parallel with the device power saver reversing one or more of the power lowering operations, and without BIOS re-authentication.

20. The apparatus of claim 19, further including a resume unit, implemented in one or more of configurable logic or fixed-functionality hardware logic, to reverse one or more power lowering operations in response to the wake event, wherein the one or more power lowering operations include to restore memory configuration data from a non-volatile memory.

21. The apparatus of claim 19, wherein the transitioner includes:
  a state clearer, implemented in one or more of configurable logic or fixed-functionality hardware logic, to conduct a reset of the processor;
  a resume unit, implemented in one or more of configurable logic or fixed-functionality hardware logic, to perform one or more processor resume operations, including to restore memory configuration data;
  a processor power saver, implemented in one or more of configurable logic or fixed-functionality hardware logic, to perform one or more processor power lowering operations including power rail modifications to reduce a power consumption of the processor; and
  a handoff unit, implemented in one or more of configurable logic or fixed-functionality hardware logic, to transfer control over the processor to the OS.

22. The apparatus of claim 21, wherein the sleeping state is to be an Advanced Configuration and Power Interface (ACPI) S3 state.

23. The apparatus of claim 19, wherein the transitioner includes:
  a processor power saver, implemented in one or more of configurable logic or fixed-functionality hardware logic, to perform one or more processor power lowering operations including power rail modifications to reduce a power consumption of the processor.

24. The apparatus of claim 23, wherein the sleeping state is to be an Advanced Configuration and Power Interface (ACPI) S1 state, wherein, when the sleeping state is the ACPI S1 state, a state clearer, implemented in one or more of configurable logic or fixed-functionality hardware logic, to conduct a reset of the processor is to be bypassed.

* * * * *